US011245655B2

(12) United States Patent
Barrs, II et al.

(10) Patent No.: US 11,245,655 B2
(45) Date of Patent: *Feb. 8, 2022

(54) FACILITATING MESSAGE PROCESSING AT A TARGET ENDPOINT

(71) Applicant: International Business Machines Corporation, Armonk, NY (US)

(72) Inventors: John W. Barrs, II, Boca Raton, FL (US); Michael J. Hudson, Delray Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/677,106

(22) Filed: Nov. 7, 2019

(65) Prior Publication Data

US 2020/0076757 A1    Mar. 5, 2020

Related U.S. Application Data

(63) Continuation of application No. 15/432,916, filed on Feb. 14, 2017, now Pat. No. 10,623,358.

(51) Int. Cl.
*H04L 12/58*    (2006.01)
*H04L 29/06*    (2006.01)
*H04L 9/32*    (2006.01)

(52) U.S. Cl.
CPC .......... *H04L 51/18* (2013.01); *H04L 9/3247* (2013.01); *H04L 63/0428* (2013.01)

(58) Field of Classification Search
CPC .... H04L 51/18; H04L 9/3247; H04L 63/0428
See application file for complete search history.

(56) References Cited

U.S. PATENT DOCUMENTS

| 6,014,688 | A  | 1/2000  | Venkatraman et al. |
| 6,332,156 | B1 | 12/2001 | Cho et al. |
| 6,360,221 | B1 | 3/2002  | Gough et al. |
| 6,697,942 | B1 | 2/2004  | L'Heureux et al. |

(Continued)

OTHER PUBLICATIONS

Zhong, Qun et al. Security Control for COTS Components. Computer, vol. 31, Issue 6, IEEE, Jun. 1998, pp. 67-73.

(Continued)

*Primary Examiner* — Viet D Vu
(74) *Attorney, Agent, or Firm* — The Steadman Law Firm PLLC

(57) ABSTRACT

An approach is described of facilitating processing of a message at a target endpoint. The approach may facilitate message processing regardless of format. A method pertaining to such approach may include receiving, at a target endpoint, a message that includes a content portion and a script code portion that is required to execute the content portion. The message may be propagated via a network. The method further may include parsing the script code portion to identify at least one instruction. The method further may include processing the content portion by executing the at least one instruction via at least one scripting engine. The at least one scripting engine may be located in a restricted operating system environment within a virtual machine.

(Continued)

According to an embodiment, the script code portion may be stored in a header of the message.

18 Claims, 4 Drawing Sheets

(56) References Cited

U.S. PATENT DOCUMENTS

| | | | |
|---|---|---|---|
| 6,848,108 B1 | 1/2005 | Caron | |
| 7,933,827 B2 | 4/2011 | Richmann et al. | |
| 9,325,528 B2 | 4/2016 | Sachtjen et al. | |
| 9,491,142 B2* | 11/2016 | Xie | G06F 21/53 |
| 9,912,681 B1 | 3/2018 | Ismael et al. | |
| 10,091,100 B1* | 10/2018 | Duerk | H04L 47/125 |
| 2009/0222922 A1* | 9/2009 | Sidiroglou | H04L 51/12 |
| | | | 726/23 |
| 2009/0241194 A1* | 9/2009 | Thomas | G06F 21/53 |
| | | | 726/24 |
| 2013/0282761 A1* | 10/2013 | Tamm | G06F 16/27 |
| | | | 707/781 |
| 2014/0324941 A1* | 10/2014 | Piernot | G06F 9/546 |
| | | | 709/202 |
| 2015/0213259 A1* | 7/2015 | Du | H04L 63/1408 |
| | | | 726/27 |
| 2016/0226834 A1 | 8/2016 | Dawson | |
| 2017/0093895 A1 | 3/2017 | Pal et al. | |
| 2018/0152471 A1 | 5/2018 | Jakobsson | |
| 2018/0227128 A1 | 8/2018 | Church et al. | |

OTHER PUBLICATIONS

Ghosh, Anup K. et al., Software Security and Privacy Risks in Mobile E-Commerce. Communications of the ACM, vol. 44, No. 2, Feb. 2001, pp. 51-57.

Levis, Philip et al. Maté: A Tiny Virtual Machine for Sensor Networks. ACM SIGPLAN Notices, vol. 37, Issue 10, Oct. 2002, pp. 85-95.

Ioannidis, Sotiris et al. Sub-Operating Systems: A New Approach to Application Security. Proceedings of the 10th Workshop on ACM SIGOPS European Workshop, Sep. 22-25, 2002, Saint-Emilion, France, pp. 108-115, ACM.

Walfish, Michael et al. TreeHouse: JavaScript Sandboxes to Help Web Developers Help Themselves. Proceedings of the 2012 USENIX Annual Technical Conference, Jun. 13-15, 2012, Boston, MA, 12 pages, USENIX Association.

List of IBM Patents or Patent Applications Treated as Related, Nov. 7, 2019. [2 pages].

* cited by examiner

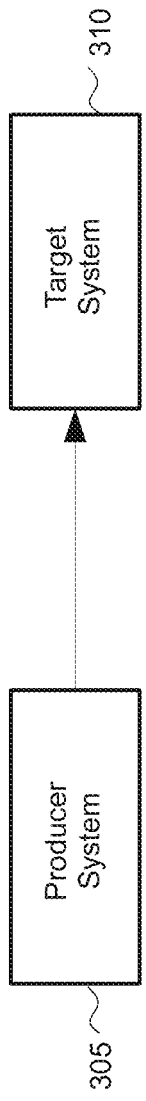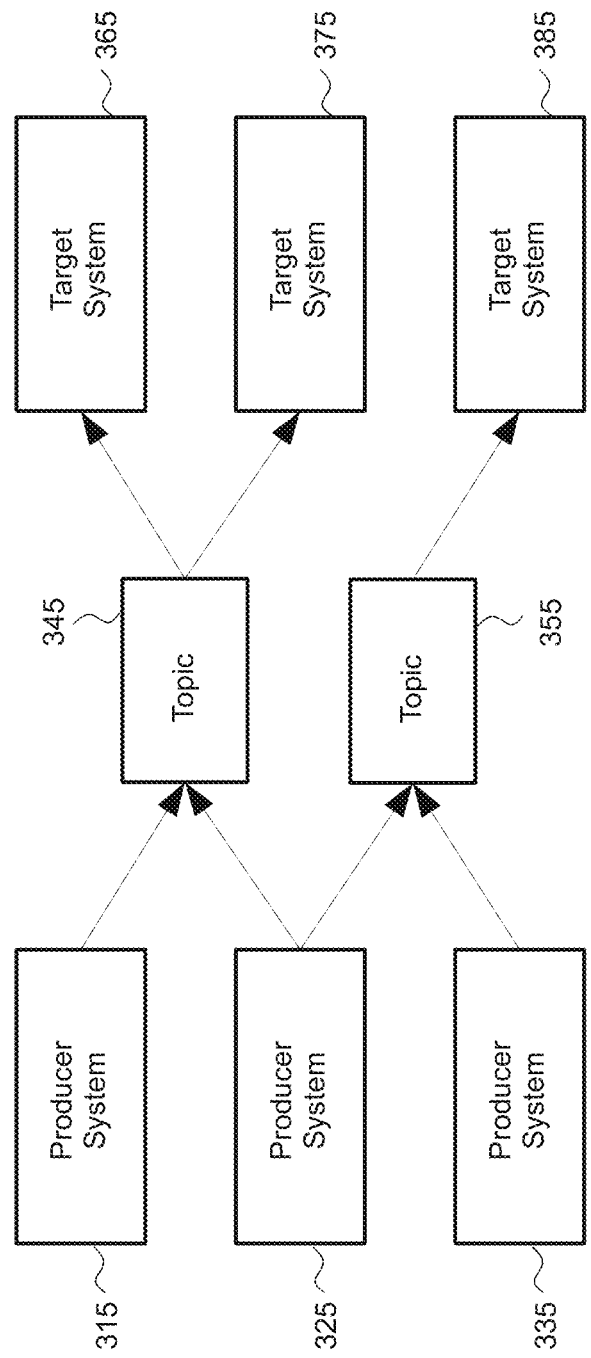

FACILITATING MESSAGE PROCESSING AT A TARGET ENDPOINT

BACKGROUND

The various embodiments described herein generally relate to message processing. More specifically, the various embodiments describe techniques of facilitating processing of a message at a target endpoint by including executable code within the message.

Messages flowing between endpoints in a computing infrastructure (e.g., within a queuing system) generally are processed by a target endpoint (i.e., destination endpoint). In each messaging scenario in which a message is processed at a target endpoint, code compatible with the message must be available at the target endpoint in order to execute message contents. Such message contents may include one or more instructions associated with the message.

SUMMARY

The various embodiments described herein provide techniques of facilitating message processing at a target endpoint. An associated method may include receiving, at a target endpoint, a message that includes a content portion and a script code portion that is required to execute the content portion. The message may be propagated via a network. The method further may include parsing the script code portion to identify at least one instruction. The method further may include processing the content portion by executing the at least one instruction via at least one scripting engine. The at least one scripting engine may be located in a restricted operating system environment within a virtual machine. According to an embodiment, the script code portion may be stored in a header of the message.

In a further embodiment, the script code portion may be encrypted via a public key associated with the target endpoint. Such encryption may be in accordance with an asymmetric key encryption scheme. In a further embodiment, the script code portion may be digitally signed via a private key associated with a source of the message. Such digital signature may serve to confirm that the message is actually sent by a purported message producer.

In a further embodiment, the at least one instruction includes at least one condition based upon at least one factor designated by a source of the message. According to such embodiment, the at least one factor may include a factor with respect to time sensitivity. Additionally or alternatively, according to such embodiment, the at least one factor may include a factor with respect to identity of the target endpoint.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

FIGS. 3A-3B illustrate example communication scenarios in the context of a peer-to-peer network configuration, according to an embodiment.

DETAILED DESCRIPTION

Figure 1:
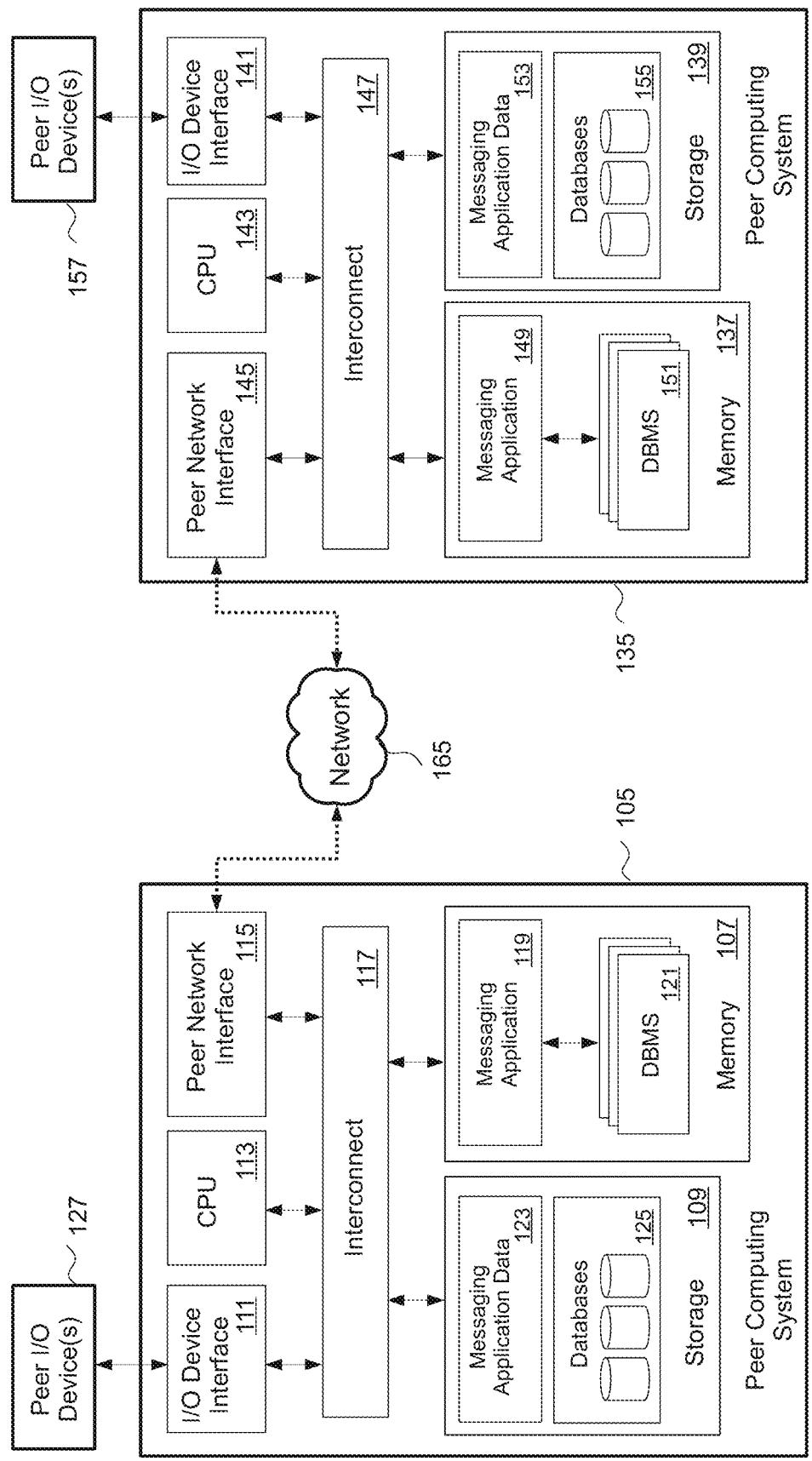
FIG. 1 illustrates a computing infrastructure, according to an embodiment.

The various embodiments described herein are directed to techniques of facilitating processing of a message at a target endpoint by including executable code within the message. A target endpoint in the context of the various embodiments may include any entity (network node, system, etc.) that receives a message within the computing environment. In the simplest scenario, all messages received at a target endpoint are processed in a single way. In other scenarios, as further described herein according to certain embodiments, messages may be handled differently based upon message content and/or message metadata.

The various embodiments described herein may have advantages over conventional techniques. Specifically, the various embodiments may enable consistent message processing in a computing environment without restriction with respect to target endpoint configuration. Furthermore, the various embodiments enable messages to function as self-executing applications and further enable target endpoints to function as flexible frameworks in which such messages may be processed. Accordingly, the various embodiments may enable message processing without any input required from a target endpoint. Additionally, the various embodiments may provide for message processing in a "sandboxed" virtual machine environment to protect a target endpoint from any potential security issues that may arise from executing message instructions. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques of facilitating message processing at a target endpoint. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes peer computing systems 105 and 135, each of which may be connected to a communications network 165. Although peer computing systems 105 and 135 are illustrated in FIG. 1, computing infrastructure 100 may include any number of peer computing systems.

Illustratively, peer computing system 105 may include a memory 107, storage 109, an input/output (I/O) device interface 111, a central processing unit (CPU) 113, and a peer network interface 115, all of which may be interconnected via interconnect 117 (e.g., a bus). Although shown as a single computing system, peer computing system 105 is included to be representative of a single peer or multiple peers in a peer-to-peer network within computing infrastructure 100. In an embodiment, peer computing system 105 may function as a thin client. Peer computing system 105 according to the various embodiments described herein may be a mobile device (e.g., a smart phone, a feature phone, a tablet device, a laptop, etc.). Alternatively, peer computing system 105 may be a stationary device (e.g., a desktop computer).

Memory 107 may include a messaging application 119 and a database management system (DBMS) 121. Messaging application 119 may be an online or network application configured for interfacing with peer computing system 135 and/or other computing systems. DBMS 121 is included to be representative of a single database management system or multiple database management systems. Storage 109 may include messaging application data 123 associated with messaging application 119 and databases 125. Messaging application 119 may send to DBMS 121 a database query request, and DBMS 121 may process such query. DBMS 121 may include a software application configured to manage databases 125. Databases 125 may include one or more ontology trees or other ontological structures. While FIG. 1 illustrates three databases 125 associated with peer computing system 105, peer computing system 105 may be associated with any number of databases. According to an embodiment, DBMS 121 may send one or more requests to remote databases (e.g., databases 155 or other databases not shown) via network 165.

Peer I/O device interface 111 may be communicatively coupled to one or more peer I/O devices 127. CPU 113 is included in FIG. 1 to be representative of a single CPU, multiple CPUs, a single CPU having multiple processing cores, or the like. Peer network interface 115 may receive data from, and may transmit data to, peer computing system 135 and/or other peer computing systems via network 165. Furthermore, peer computing system 105 may be configured to interface with client systems and/or server systems in computing infrastructure 100.

Peer computing system 135 may include a memory 137, storage 139, an I/O device interface 141, a central processing unit (CPU) 143, and a peer network interface 145, all of which may be interconnected via interconnect 147 (e.g., a bus). Although shown as a single computing system, peer computing system 135 is included to be representative of a single peer or multiple peers in a peer-to-peer network within computing infrastructure 100. In an embodiment, peer computing system 135 may function as a thin client. Peer computing system 135 according to the various embodiments described herein may be a mobile device (e.g., a smart phone, a feature phone, a tablet device, a laptop, etc.). Alternatively, peer computing system 135 may be a stationary device (e.g., a desktop computer).

Memory 137 may include a messaging application 149 and a database management system (DBMS) 151. Messaging application 149 may be an online or network application configured for interfacing with peer computing system 105 and/or other computing systems. DBMS 151 is included to be representative of a single database management system or multiple database management systems. Storage 139 may include messaging application data 153 associated with messaging application 149 and databases 155. Messaging application 149 may send to DBMS 151 a database query request, and DBMS 151 may process such query. DBMS 151 may include a software application configured to manage databases 155. Databases 155 may include one or more ontology trees or other ontological structures. While FIG. 1 illustrates three databases 155 associated with peer computing system 135, peer computing system 135 may be associated with any number of databases. According to an embodiment, DBMS 151 may send one or more requests to remote databases (e.g., databases 125 or other databases not shown) via network 165.

Peer I/O device interface 141 may be communicatively coupled to one or more peer I/O devices 157. CPU 143 is included in FIG. 1 to be representative of a single CPU, multiple CPUs, a single CPU having multiple processing cores, or the like. Peer network interface 145 may receive data from, and may transmit data to, peer computing system 105 and/or other peer computing systems via network 165. Furthermore, peer computing system 135 may be configured to interface with client systems and/or server systems in computing infrastructure 100.

According to an embodiment, peer computing system 135 may be a target endpoint which may receive a message produced by peer computing system 105 or another peer computing system within computing infrastructure 100. According to a further embodiment, peer computing system 105 may be a target endpoint which may receive a message produced by peer computing system 135 or another peer computing system within computing infrastructure 100.

Figure 2:
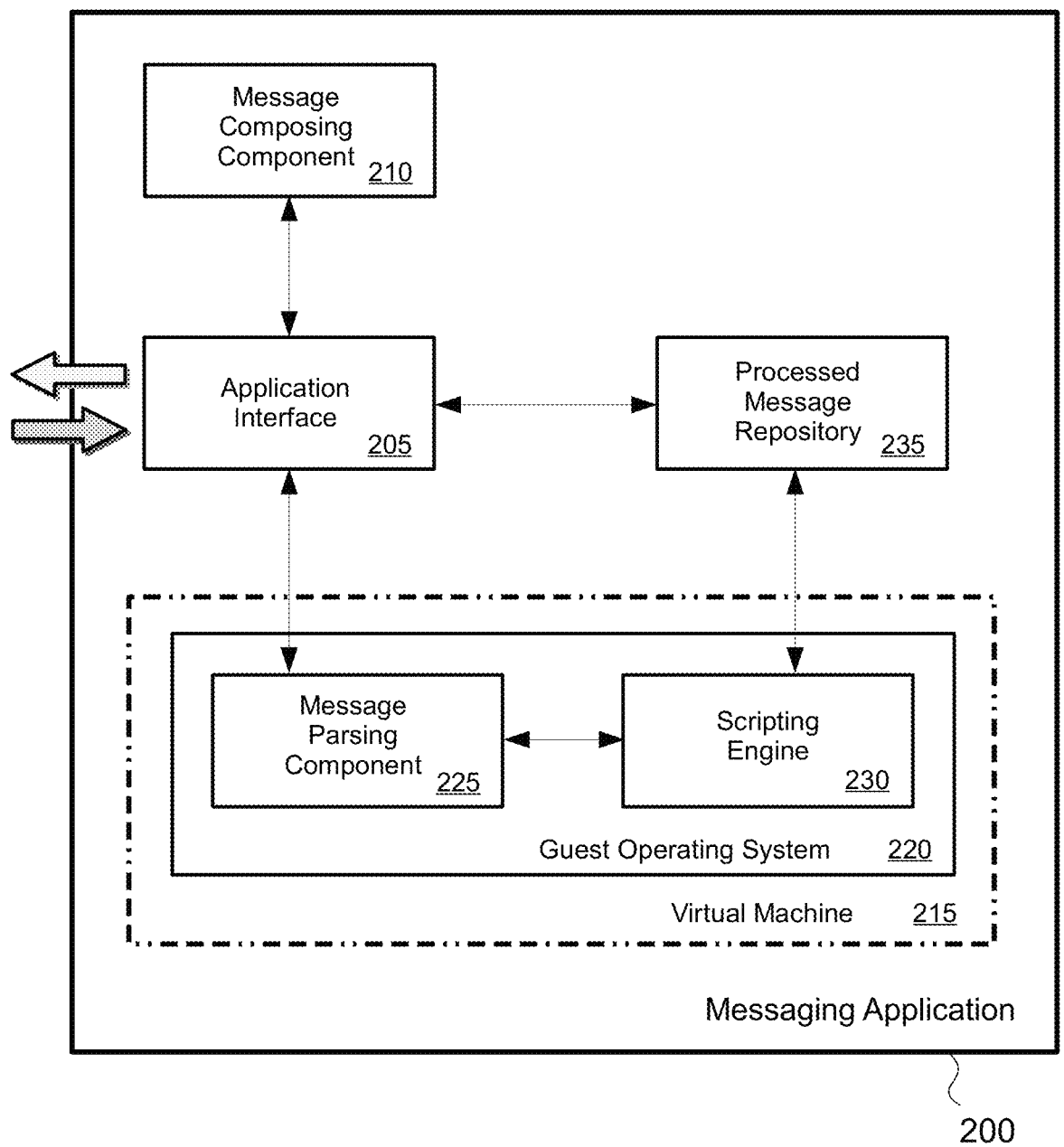
FIG. 2 illustrates a messaging application, according to an embodiment.

FIG. 2 illustrates a messaging application 200 according to an embodiment. Messaging application 200 may reflect some or all details of messaging application 119 of peer computing system 105. Additionally or alternatively, messaging application 200 may reflect some or all details of messaging application 149 of peer computing system 135.

Messaging application 200 may include an application interface 205. Application interface 205 may send data to, and receive data from, other components within computing infrastructure 100. In an embodiment, application interface 205 may be a graphical user interface (GUI) with appropriate objects to interact with a message received or to configure a message to be sent in accordance with the various embodiments described herein. According to such embodiment, application interface 205 may provide text boxes, radio buttons, drop down menus, and/or similar GUI objects for the purpose of interacting with a received message or configuring a message to be sent. Additionally or alternatively, application interface 205 may provide an ability to enter one or more command lines in order to interact with a message received or to configure a message to be sent in accordance with the various embodiments.

Messaging application 200 further may include a message composing component 210. Message composing component 210 may facilitate production of messages that may be relayed to one or more other computing systems within computing infrastructure 100. A produced message may include a content portion and a script code portion in accordance with the various embodiments described herein.

Messaging application 200 further may include a virtual machine 215. Virtual machine 215 may include a restricted operating system environment to protect a computing system in which messaging application 200 is located (e.g., peer computing system 105 or peer computing system 135) from any security issue that may arise from processing a script code portion or a content portion of a received message. Accordingly, virtual machine 215 may serve as a "sandbox" for message processing. Virtual machine 215 may include a guest operating system 220. Guest operating system 220 of virtual machine 215 may include a message parsing component 225. Message parsing component 225 may facilitate parsing of messages received from another computing system within computing infrastructure 100. Specifically, message parsing component 225 may parse a received message into a content portion and a script code portion in accordance with the various embodiments described herein. Guest operating system 220 of virtual machine 215 further may include a scripting engine 230 configured to process a message parsed by message parsing component 225. Virtual machine 215 may process a parsed message by processing the content portion of the message through execution via scripting engine 230 of any instruction(s) provided by the script code portion of the message. The processed message may be relayed from virtual machine 215 to processed message repository 235 for storage. The processed message then may be relayed from processed message repository 235 to application interface 205 for consumption and/or for any further processing (e.g., formatting).

FIGS. 3A-3B illustrate example communication scenarios in the context of the peer-to-peer network configuration of computing infrastructure 100. FIG. 3A illustrates an example point-to-point communication scenario, in which a producer system 305 may propagate a message to a target system 310. According to the point-to-point communication scenario as illustrated in FIG. 3A, script associated with a message is executed only at target system 310. In the context of computing infrastructure 100, peer computing system 105 may serve as producer system 305 and peer computing system 135 may serve as target system 310 in a given messaging scenario. Conversely, peer computing system 135 may serve as producer system 305 and peer computing system 105 may serve as target system 310 in a given messaging scenario.

FIG. 3B illustrates an example publish-subscribe communication scenario, in which producer system 315, producer system 325, and producer system 335 each may publish one or more messages associated with one or more of topics 345 and 355 to one or more databases and/or server systems associated with the respective topics. Specifically, according to the publish-subscribe communication scenario as illustrated in FIG. 3B, producer system 315 may publish a message associated with topic 345, producer system 325 may publish respective messages associated with topics 345 and 355, and producer system 335 may publish a message associated with topic 355. Target system 365, target system 375, and target system 385 may subscribe to one or more of topics 345 and 355 such that they may receive and execute script associated with any message(s) published to the topic(s) to which they subscribe. Specifically, according to the publish-subscribe communication scenario as illustrated in FIG. 3B, target systems 365 and 375 each may subscribe to topic 345 such that each of target systems 365 and 375 may receive message(s) published to topic 345, and target system 385 may subscribe to topic 355 such that target system 385 may receive message(s) published to topic 355. In the context of computing infrastructure 100, peer computing system 105 may serve as one of producer systems 315, 325, 335 or one of the target systems 365, 375, 385 in a given messaging scenario. Furthermore, peer computing system 135 may serve as one of producer systems 315, 325, 335 or one of the target systems 365, 375, 385 in a given messaging scenario.

Figure 4:
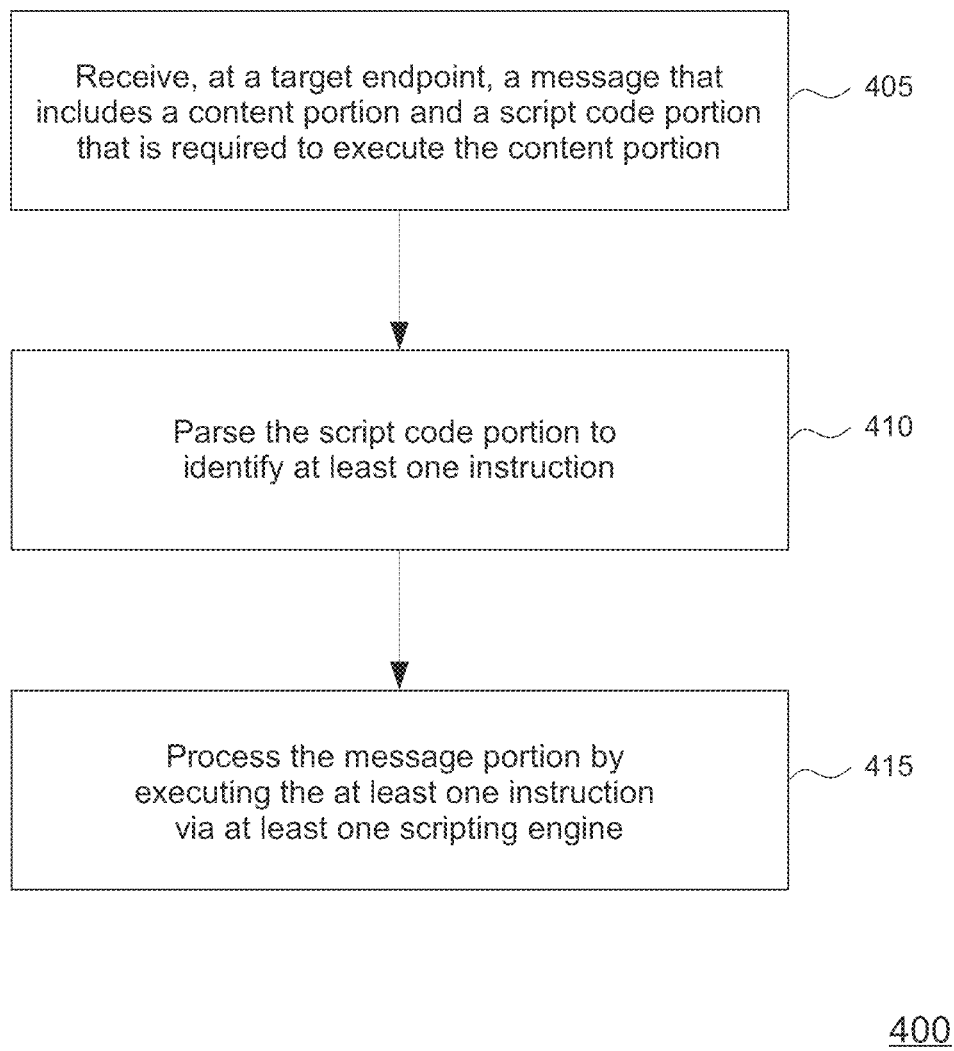
FIG. 4 illustrates a method of facilitating processing of a message at a target endpoint, according to an embodiment.

FIG. 4 illustrates a method 400 of facilitating processing of a message at a target endpoint (e.g., peer computing system 105 or peer computing system 135), according to an embodiment. One or more steps associated with the method 400 may be carried out in a peer-to-peer network computing environment (e.g., computing infrastructure 100). Additionally or alternatively, one or more steps associated with the method 400 may be carried out within one or more workloads of a cloud computing environment. Additionally or alternatively, one or more steps associated with the method 400 may be carried out in a client-server environment. A messaging application of the target endpoint (e.g., messaging application 200, which may be representative of messaging application 119 in the event that peer computing system 105 is the target endpoint or messaging application 149 in the event that peer computing system 135 is the target endpoint) may facilitate processing according to the method 400.

The method 400 may begin at step 405, where the messaging application of the target endpoint may receive a message that includes a content portion and a script code portion that is required to execute the content portion. The message may be propagated via a network (e.g., network 165). At step 410, the messaging application may parse the script code portion of the message to identify at least one instruction. In an embodiment, the script code portion may be stored in a header of the message. In a further embodiment, the messaging application may parse the script code portion via a message parsing component located in a restricted operating system environment within a virtual machine (e.g., message parsing component 225 located in guest operating system 220 within virtual machine 215).

At step 415, the messaging application may process the content portion of the message by executing the at least one instruction identified at step 410. The messaging application may execute the at least one instruction via at least one scripting engine, which in an embodiment also may be located in a restricted operating system environment within a virtual machine (e.g., scripting engine 230 located in guest operating system 220 within virtual machine 215). The at least one instruction parsed from the script code portion of the message may enable the messaging application to produce a processed message at the target endpoint without regard to the messaging processing capabilities or formatting constraints of the target endpoint. The target endpoint may serve as a framework in which to process a self-executing message.

For instance, the messaging application of the target endpoint may receive a message that is to be persisted in a database, wherein the format of such message is unique to the message producer. In such case, the message producer may embed the necessary logic to parse and execute the message within a script code portion of the message, which may be located in a header of the message. Upon receipt of the message, the messaging application of the target endpoint may parse the message and execute the logic (i.e., at least one code instruction) embedded within the script code portion of the message in order to make necessary database updates based upon a content portion of the message.

In an embodiment, the message may be encrypted according to an asymmetric key encryption scheme. According to such embodiment, the script code portion may be encrypted via a public key associated with the target endpoint. More specifically, according to such embodiment, the message may be encrypted by the message producer via a public key associated with the target endpoint, and subsequently the message may be decrypted by the target endpoint via a private key associated with the target endpoint.

In a further embodiment, the message may be digitally signed. According to such embodiment, the script code portion may be digitally signed via a private key associated with a source of the message (e.g., the message producer). The digital signature associated with the source of the message may serve to confirm that the message actually originated from a purported message producer. More specifically, according to such embodiment, the message producer may encrypt a digital signature via a private key associated with the message producer, and subsequently the target endpoint may verify the identity of message producer by decrypting the digital signature via a public key of the message producer.

In a further embodiment, the at least one instruction identified from the script code portion of the message may include at least one condition based upon at least one factor designated by a source of the message (e.g., the message producer). According to such embodiment, execution of one or more instructions of a message at step 415 may depend upon satisfaction of one or more of the at least one condition. Furthermore, according to such embodiment, the significance of the message may fluctuate based upon the state of affairs and/or actions at the target endpoint. Accordingly, the message producer may not have total control and/or may not be privy to the outcome of the at least one condition designated in the message. The at least one condition may be included within the content portion of the message. Additionally or alternatively, the at least one condition may be included within metadata that is included within a header of the message.

According to an embodiment, the at least one factor upon which the at least one condition may be based may include a factor with respect to time sensitivity. More specifically, execution of one or more instructions of a message at step 415 may depend upon the exact time at which the message is received at the target endpoint. In such case, the message producer may not have total control as to the exact receipt time and/or may not be privy as to the exact receipt time. For instance, assuming that a message includes time-sensitive information that must be calculated upon receipt by the target endpoint, the message may stipulate that a fee for routing the message may or may not be imposed or that the fee may differ depending on the exact time that the message is received by the target endpoint.

According to an embodiment, the at least one factor upon which the at least one condition may be based may include a factor with respect to identity of the target endpoint. More specifically, execution one or more instructions of a message at step 415 may depend upon the identity of the target endpoint. A condition based upon target endpoint identity may impact whether the message or portions thereof may be processed by the target endpoint. For instance, responsive to the message or designated portion(s) thereof including security-sensitive items vulnerable to exploitation based upon the identity of the target endpoint, condition(s) within the message may stipulate that the message or the designated portion(s) thereof may not be executed at the target endpoint.

Additionally or alternatively, condition(s) based upon target endpoint identity may stipulate that processing of the message or designated portion(s) thereof may be contingent upon the target endpoint being a member of one or more designated groups. For instance, condition(s) in the message may stipulate that processing of the message or designated portion(s) thereof is contingent upon the target endpoint being included in a group of designated message recipients. Additionally or alternatively, condition(s) based upon target endpoint identity may stipulate that processing of the message or designated portion(s) thereof may be contingent upon the target endpoint having one or more designated characteristics. For instance, condition(s) in the message may stipulate that processing of the message or designated portion(s) thereof is contingent upon the target endpoint having write access privileges to a designated database.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
 receiving, at a target endpoint, a message that includes a content portion and a script code portion that is required to execute the content portion, wherein the message is propagated via a network;

parsing the script code portion via a message parsing component to identify at least one instruction; and processing the content portion by executing the at least one instruction via at least one scripting engine communicatively coupled to the message parsing component, wherein the at least one scripting engine and the message parsing component are located in a restricted operating system environment within a virtual machine, and wherein message processing is contingent upon the target endpoint having write access privileges to a designated database.

2. The method of claim 1, wherein the script code portion is encrypted via a public key associated with the target endpoint.

3. The method of claim 1, wherein the script code portion is digitally signed via a private key associated with a source of the message.

4. The method of claim 1, wherein execution of one or more of the at least one instruction is dependent upon identity of the target endpoint responsive to the message including security-sensitive material.

5. The method of claim 1, wherein message processing is further contingent upon the target endpoint having one or more designated characteristics.

6. A computer program product comprising a computer readable storage medium having program instructions embodied therewith, the program instructions executable by a computing device to cause the computing device to:

receive, at a target endpoint, a message that includes a content portion and a script code portion that is required to execute the content portion, wherein the message is propagated via a network;

parse the script code portion via a message parsing component to identify at least one instruction; and process the content portion by executing the at least one instruction via at least one scripting engine communicatively coupled to the message parsing component, wherein the at least one scripting engine and the message parsing component are located in a restricted operating system environment within a virtual machine, and wherein message processing is contingent upon the target endpoint having write access privileges to a designated database.

7. The computer program product of claim 6, wherein the script code portion is encrypted via a public key associated with the target endpoint.

8. The computer program product of claim 6, wherein the script code portion is digitally signed via a private key associated with a source of the message.

9. The computer program product of claim 6, wherein execution of one or more of the at least one instruction is dependent upon identity of the target endpoint responsive to the message including security-sensitive material.

10. The computer program product of claim 6, wherein message processing is further contingent upon the target endpoint having one or more designated characteristics.

11. A system comprising:

a processor; and a memory storing an application program, which, when executed on the processor, performs an operation comprising:

receiving, at a target endpoint, a message that includes a content portion and a script code portion that is required to execute the content portion, wherein the message is propagated via a network;

parsing the script code portion via a message parsing component to identify at least one instruction; and processing the content portion by executing the at least one instruction via at least one scripting engine communicatively coupled to the message parsing component, wherein the at least one scripting engine and the message parsing component are located in a restricted operating system environment within a virtual machine, and wherein message processing is contingent upon the target endpoint having write access privileges to a designated database.

12. The system of claim 11, wherein the script code portion is encrypted via a public key associated with the target endpoint.

13. The system of claim 11, wherein the script code portion is digitally signed via a private key associated with a source of the message.

14. The system of claim 11, wherein execution of one or more of the at least one instruction is dependent upon identity of the target endpoint responsive to the message including security-sensitive material.

15. The system of claim 11, wherein message processing is further contingent upon the target endpoint having one or more designated characteristics.

16. The method of claim 1, wherein message processing is conditioned upon the target endpoint being included in a group of designated message recipients.

17. The computer program product of claim 6, wherein message processing is conditioned upon the target endpoint being included in a group of designated message recipients.

18. The system of claim 11, wherein message processing is conditioned upon the target endpoint being included in a group of designated message recipients.

* * * * *